United States Patent
Tanaka et al.

(10) Patent No.: US 10,763,739 B2
(45) Date of Patent: Sep. 1, 2020

(54) POWER CONVERSION DEVICE AND POWER SUPPLY SYSTEM USING SAME

(71) Applicant: Hitachi Automotive Systems, Ltd., Hitachinaka-shi, Ibaraki (JP)

(72) Inventors: Shintaro Tanaka, Tokyo (JP); Takae Shimada, Tokyo (JP); Tadahiko Chida, Tokyo (JP); Mikito Komatsu, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 94 days.

(21) Appl. No.: 15/575,461

(22) PCT Filed: Apr. 27, 2016

(86) PCT No.: PCT/JP2016/063122
§ 371 (c)(1),
(2) Date: Nov. 20, 2017

(87) PCT Pub. No.: WO2016/190031
PCT Pub. Date: Dec. 1, 2016

(65) Prior Publication Data
US 2018/0175720 A1 Jun. 21, 2018

(30) Foreign Application Priority Data
May 22, 2015 (JP) .................. 2015-104119

(51) Int. Cl.
*B60L 58/20* (2019.01)
*H02M 1/088* (2006.01)
(Continued)

(52) U.S. Cl.
CPC .............. *H02M 1/088* (2013.01); *B60L 58/20* (2019.02); *H02J 7/342* (2020.01); *H02M 3/285* (2013.01);
(Continued)

(58) Field of Classification Search
CPC ............. H02M 1/088; H02M 3/33592; H02M 3/33584; H02M 3/285; H02M 2001/0054;
(Continued)

(56) References Cited

U.S. PATENT DOCUMENTS

| 6,054,674 A | 4/2000 | Moriguchi et al. |
| 2005/0270806 A1 | 12/2005 | Zhu |

(Continued)

FOREIGN PATENT DOCUMENTS

| JP | H11-206123 A | 7/1999 |
| JP | 2010-124671 A | 6/2010 |

(Continued)

OTHER PUBLICATIONS

International Search Report with English Translation and Written Opinion issued in corresponding application No. PCT/JP2016/063122 dated Aug. 9, 2016.

(Continued)

*Primary Examiner* — Jung Kim
(74) *Attorney, Agent, or Firm* — Foley & Lardner LLP (57) ABSTRACT

A power conversion device includes: a first low voltage side circuit and a first high voltage side circuit which are connected via a first transformer; and a second low voltage side circuit and a second high voltage side circuit which are connected via a second transformer, wherein switching timings of the first high voltage side circuit and the second high voltage side circuit are controlled such that a current difference of an input current to the first low voltage side circuit and an input current to the second low voltage side circuit during a step-up operation becomes smaller than a predetermined value. A driver circuit to output a drive signal of a switching element may be included in at least one of the first low voltage side circuit and the second low voltage side circuit.

15 Claims, 10 Drawing Sheets

(51) Int. Cl.
  *H02M 3/28* (2006.01)
  *H02J 7/34* (2006.01)
  *H02M 3/335* (2006.01)
  *H02M 1/00* (2006.01)
(52) U.S. Cl.
  CPC ... *H02M 3/33584* (2013.01); *H02M 3/33592* (2013.01); *H02J 2207/20* (2020.01); *H02M 2001/0054* (2013.01)
(58) Field of Classification Search
  CPC ...... H02M 1/08; H02M 3/33576; H02M 3/28; B60L 58/20; B60L 58/22; H02J 7/0054; H02J 2007/0059
  See application file for complete search history.

(56) References Cited

U.S. PATENT DOCUMENTS

| | | | |
|---|---|---|---|
| 2010/0142240 A1 | 6/2010 | Lee et al. | |
| 2010/0182814 A1 | 7/2010 | Tada et al. | |

FOREIGN PATENT DOCUMENTS

| | | | |
|---|---|---|---|
| JP | 2013-005594 A | 1/2013 | |
| WO | WO-2009/001854 A1 | 12/2008 | |

OTHER PUBLICATIONS

Office Action issued in corresponding German Patent Application No. 112016001906.8, dated Aug. 16, 2019 with English translation.

POWER CONVERSION DEVICE AND POWER SUPPLY SYSTEM USING SAME

TECHNICAL FIELD

The present invention relates to a switching power supply device and a power conversion device having a control circuit to control the switching power supply device and particularly, to a power conversion device mounted on a vehicle.

BACKGROUND ART

Recently, due to depletion of fossil fuels and deterioration of global environmental problems, there is growing interest in vehicles using electric energy such as hybrid vehicles and electric vehicles and practical use progresses. A vehicle using such electric energy often includes a power conversion device that steps down a voltage from a high voltage battery to supply power to a motor to drive wheels and supplies necessary power to a low voltage electric device. A switching power supply device is generally used in the power conversion device that supplies power to an electric device such as an air conditioner, a stereo system, and a controller of the vehicle. In addition, a bidirectional switching power supply capable of performing not only a step-down operation but also a step-up operation is required in the switching power supply device. This may be used to supply power from a low voltage battery to cause the high voltage battery to be operable, when the high voltage battery performs discharging.

Here, when the power conversion device converts the power, losses such as copper loss and fixed loss occur. The copper loss occurring in the switching power supply device is proportional to the square of a flowing current. For this reason, to improve conversion efficiency of the power conversion device, two or more switching power supply devices may be provided in parallel. Because an output current of each switching power supply can be halved by configuring the power conversion devices connected in parallel, the copper loss is reduced. As a result, the conversion efficiency of the power conversion device can be greatly improved.

Generally, in the switching power supply devices connected in parallel, an imbalance of a current occurs between the switching power supplies due to an element variation or a difference of wiring line lengths, in elements mounted on the switching power supplies. If the current imbalance occurs, the current concentrates on one side of the switching power supplies connected in parallel. If the current concentrates, the losses in the switching power supply devices become larger than losses in a normal state and a design with a margin is required for a current or heat dissipation design. Generally, because the individual switching power supplies connected in parallel are designed with the same design value, a design value with a margin is required for the switching power supply on which the current does not concentrate. Therefore, if the current imbalance occurs, a design value with a margin is required for a current or heat dissipation condition in the individual switching power supplies, which results in hindering reduction of sizes and costs of the switching power supplies connected in parallel.

Therefore, there is a method of independently controlling switching elements of each of the plurality of switching power supply devices connected in parallel, when the current imbalance occurs. When the current imbalance occurs, a current imbalance amount is detected and each switching power supply device is controlled independently, so that control to suppress a current imbalance difference is performed. By this control method, the current imbalance amount is controlled to be smaller, when the current imbalance occurs. Therefore, the current imbalance of the switching power supply devices connected in parallel is improved. For example, Japanese Patent Application Laid-Open No. 2010-124671 (PTL 1) is known as a power conversion device in which such control is performed during step-up in particular.

CITATION LIST

Patent Literature

PTL 1: Japanese Patent Application Laid-Open No. 2010-124671

SUMMARY OF INVENTION

Technical Problem

Meanwhile, the power conversion device is configured to control each low voltage side switching element of each switching power supply to suppress the current imbalance during the step-up operation. However, because the above configuration is adopted in PTL 1, there are the following problems. That is, because each of the low voltage side elements of the switching power supply devices connected in parallel is controlled, drive circuits to drive the low voltage side elements also increase according to a parallel number and the cost and the size of the power conversion device increase.

The present invention has been made in view of the above problems and an object thereof is to provide a power conversion device including a plurality of switching power supply devices connected in parallel and including a circuit configuration capable of reducing a cost and a size of the power conversion device and a novel control method capable of suppressing a current imbalance in the circuit configuration and a vehicle including the same.

Solution to Problem

A power conversion device according to the present invention includes: a first low voltage side circuit and a first high voltage side circuit which are connected via a first transformer; and a second low voltage side circuit and a second high voltage side circuit which are connected via a second transformer, wherein switching timings of the first high voltage side circuit and the second high voltage side circuit are controlled such that a current difference of an input current to the first low voltage side circuit and an input current to the second low voltage side circuit during a step-up operation becomes smaller than a predetermined value. Further preferably, a driver circuit to output a drive signal of a switching element is included in at least one of the first low voltage side circuit and the second low voltage side circuit.

Advantageous Effects of Invention

According to the present invention, a current imbalance of power supply devices connected in parallel can be suppressed while a cost and a size of a power conversion device are reduced.

BRIEF DESCRIPTION OF DRAWINGS

FIG. 10($a$) is a diagram illustrating a flow of power in an embodiment 4(a).

FIG. 10($b$) is a diagram illustrating a flow of power in an embodiment 4(b).

FIG. 10($c$) is a diagram illustrating a flow of power in an embodiment 4(c).

DESCRIPTION OF EMBODIMENTS

Hereinafter, embodiments of a power conversion device according to the present invention will be described with reference to the drawings. In the individual drawings, the same elements are denoted by the same reference numerals and redundant description is omitted. The present invention is not limited to the following embodiments and includes various modifications and application examples within the technical concept of the present invention in a range thereof.

First Embodiment

Figure 1:
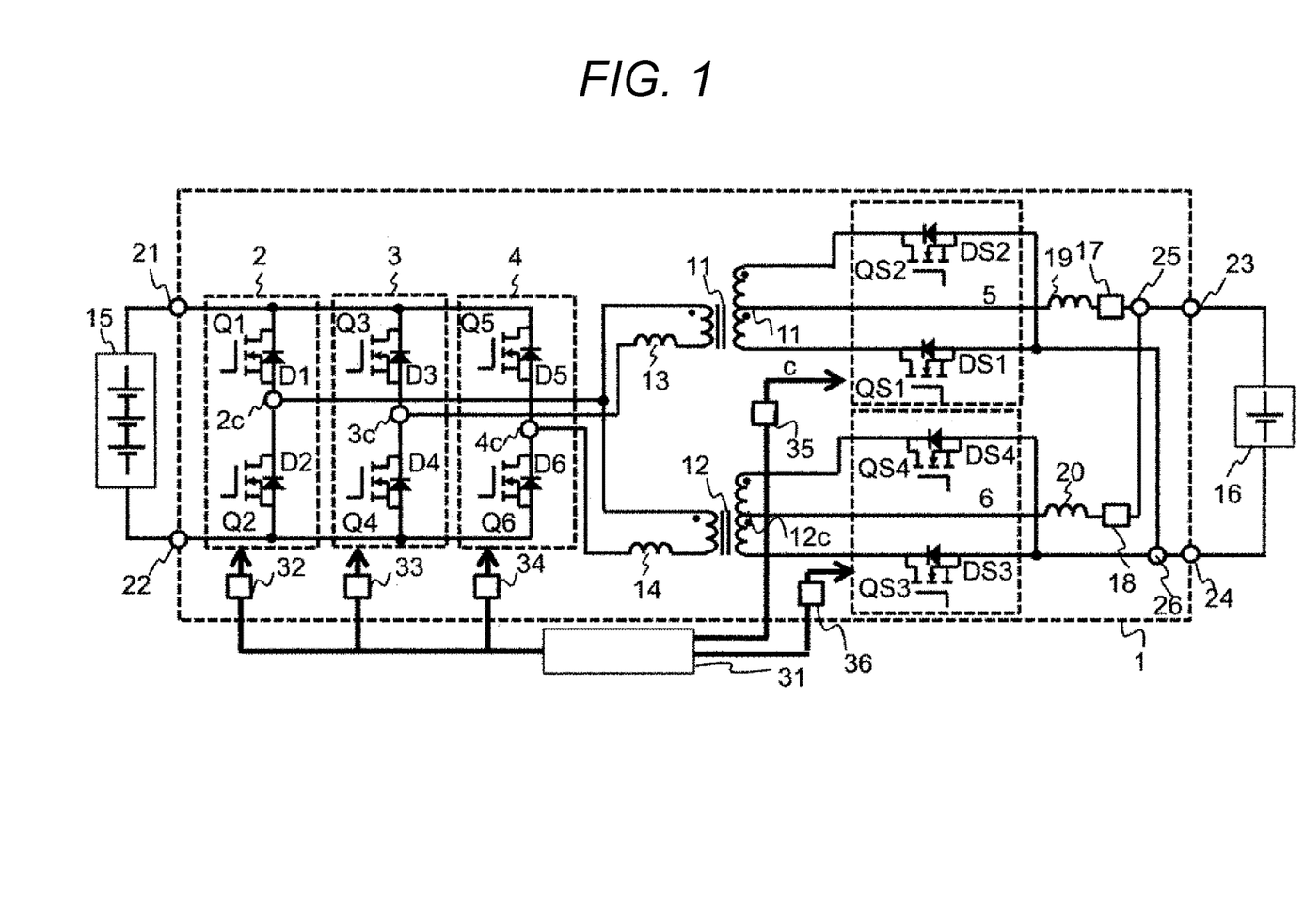
FIG. 1 is a diagram illustrating a circuit configuration of a power conversion device in a first embodiment.

FIG. 1 is a configuration diagram of a power conversion device in a first embodiment. The power conversion device in this embodiment is configured using a switching power supply device 1. The switching power supply device 1 has a first transformer 11, a second transformer 12, low voltage side circuits connected to low voltage sides of the transformers, and high voltage side circuits connected to high voltage sides of the transformers.

A high voltage terminal 21 of the switching power supply device 1 is connected to a positive electrode of a high voltage battery 15. A high voltage terminal 22 of the switching power supply device 1 is connected to a negative electrode of the high voltage battery 15. In addition, a smoothing capacitor may be inserted in parallel with the high voltage battery 15 and a high voltage load may be connected in parallel in addition to the high voltage battery 15.

A common switching leg 2, a first switching leg 3, and a second switching leg 4 are connected in parallel between the high voltage terminal 21 and the high voltage terminal 22 of the switching power supply device 1. One terminal of the common switching leg 2, one terminal of the first switching leg 3, and one terminal of the second switching leg 4 are connected to the high voltage terminal 21. The other terminal of the common switching leg 2, the other terminal of the first switching leg 3, and the other terminal of the second switching leg 4 are connected to the high voltage terminal 22.

The common switching leg 2 has two MOSFETs Q1 and Q2 connected in series and body diodes in the MOSFETs or external diodes D1 and D2. The first switching leg 3 has two MOSFETs Q3 and Q4 connected in series and body diodes in the MOSFETs or external diodes D3 and D4. The second switching leg 4 has two MOSFETs Q5 and Q6 connected in series and body diodes in the MOSFETs or external diodes D5 and D6. In this embodiment, the MOSFETs are used, but switching elements such as IGBTs may be used.

A middle point 2$c$ of the common switching leg 2 is connected to one terminal of a primary winding of the first transformer 11 and one terminal of a primary winding of the second transformer 12. A middle point 3$c$ of the first switching leg 3 is connected to the other terminal of the primary winding of the first transformer 11. A middle point 4$c$ of the second switching leg 4 is connected to the other terminal of the primary winding of the second transformer 12.

The first transformer 11 is connected to a first low voltage circuit 5. The first low voltage circuit 5 includes switching elements QS1 and QS2 and diodes DS1 and DS2. The first low voltage circuit 5 is connected to a parallel circuit connection terminal 26. A middle point 11$c$ of the first transformer 11 is connected to one terminal of a smoothing inductor 19. The other terminal of the smoothing inductor 19 is connected to one terminal of a current detector 17 which detects a current. The other terminal of the current detector 17 is connected to a parallel connection terminal 25.

The second transformer 12 is connected to a second low voltage circuit 6. The second low voltage circuit 6 includes switching elements QS3 and QS4 and diodes DS3 and DS4. The second low voltage circuit 6 is connected to the parallel circuit connection terminal 26. A middle point 12$c$ of the second transformer 12 is connected to one terminal of a smoothing inductor 20. The other terminal of the smoothing inductor 20 is connected to one terminal of a current detector 18 which detects a current. The other terminal of the current detector 18 is connected to the parallel connection terminal 25.

A low voltage terminal 23 of the switching power supply device 1 is connected to a positive electrode of a low voltage battery 16. A low voltage terminal 24 of the switching power supply device 1 is connected to a negative electrode of the low voltage battery 16. Furthermore, a smoothing capacitor may be inserted in parallel with the low voltage battery 16 and a low voltage load may be connected in parallel in addition to the low voltage battery 16. In addition, a smoothing circuit configured using an inductor and a capacitor may be inserted into the low voltage circuits 5 and 6.

The power conversion device according to this embodiment includes a control circuit 31. The control circuit 31 controls operations of the common switching leg 2, the first switching leg 3, the second switching leg 4, the first low voltage circuit 5, and the second low voltage circuit 6. Each control signal output from the control circuit 31 is input to a drive circuit 32 of the common switching leg, drive circuits 33 and 34 of high voltage circuits, and drive circuits 35 and 36 of low voltage circuits, and is converted into power capable of driving each switching element.

Figure 2:
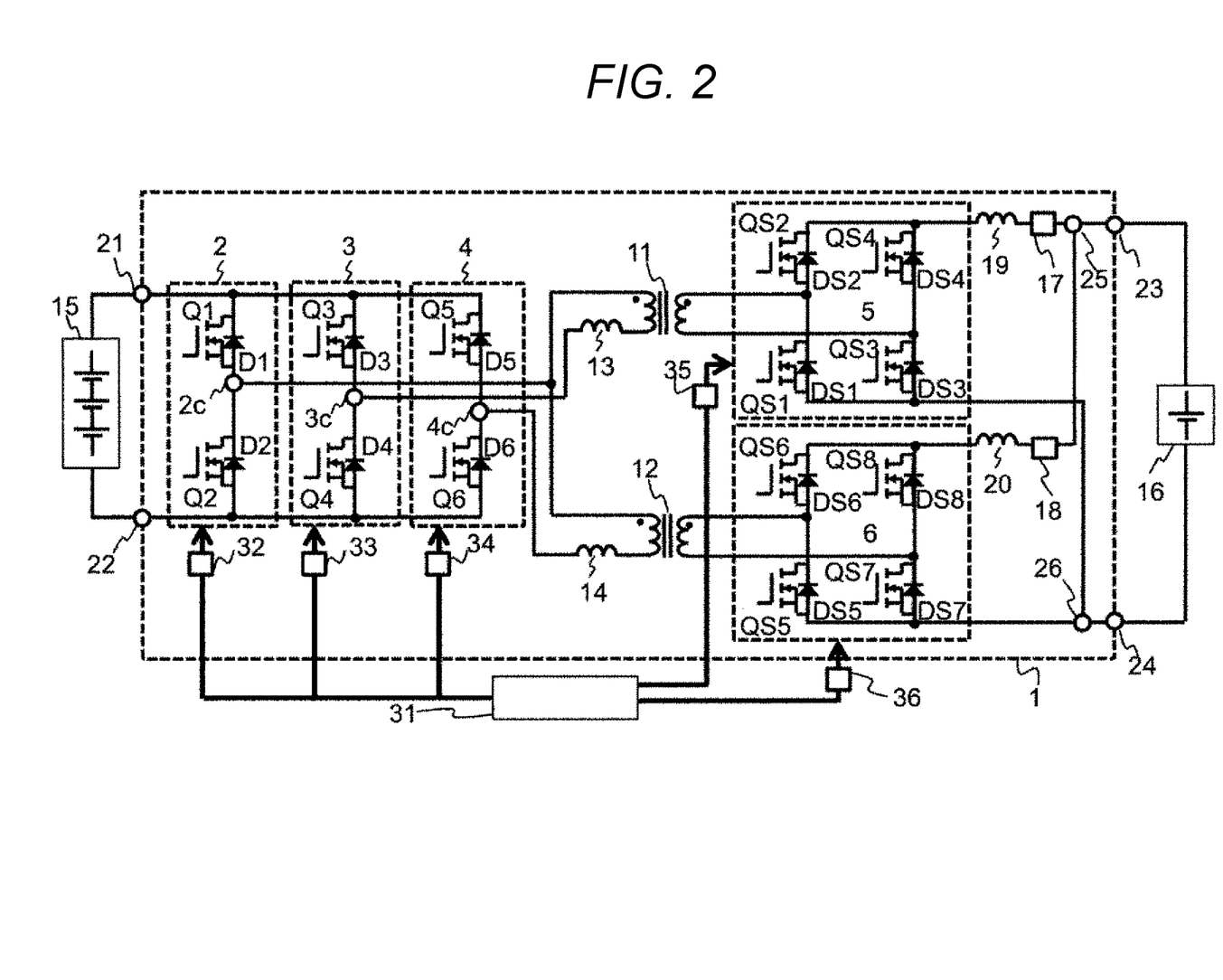
FIG. 2 is a diagram illustrating a circuit configuration of a power conversion device in which low voltage circuits in the first embodiment are changed.

In this embodiment described in FIG. 1, the first transformer 11 and the second transformer 12 adopt a center tap method. However, a current doubler method or other method may be used. In addition, the first low voltage circuit and the second low voltage circuit are not limited to step-up circuits illustrated in FIG. 1 and step-up may be performed using bridge circuits illustrated in FIG. 2. In addition, in the switching power supply device 1, the current detector 17 detecting the current is connected between the parallel connection terminal 25 and the middle point 11c of the first transformer 11. However, the current detector 17 may be provided in a place where a current amount of a parallel circuit can be detected. The current detector 18 detecting the current is connected between the parallel connection terminal 26 and the middle point 12c of the first transformer 12. However, the current detector 18 may be provided in a place where a current amount of a parallel circuit can be detected. In addition, if winding number ratios of the first transformer 11 and the second transformer 12 are equal to each other, winding numbers of the first transformer 11 and the second transformer 12 may be different from each other.

The control circuit 31 monitors the currents detected by the current detectors 17 and 18. The control circuit 31 controls the operations of the common switching leg 2, the first switching leg 3, the second switching leg 4, the first low voltage circuit 5, and the second low voltage circuit 6 of the switching power supply device 1, on the basis of the detected current amounts. Here, the current detected by the current detector 17 of the switching power supply device 1 is defined as Io1 and the current detected by the current detector 18 of the switching power supply device 1 is defined as Io2.

Hereinafter, it is assumed that the current Io1 detected by the current detector 17 is larger than the current Io2 detected by the current detector 18 (Io1>Io2) due to an element variation, in the switching power supply device 1. When the current Io1 detected by the current detector 17 is smaller than the current Io2 detected by the current detector 18 (Io2>Io1), a symmetrical operation is performed.

Figure 3:
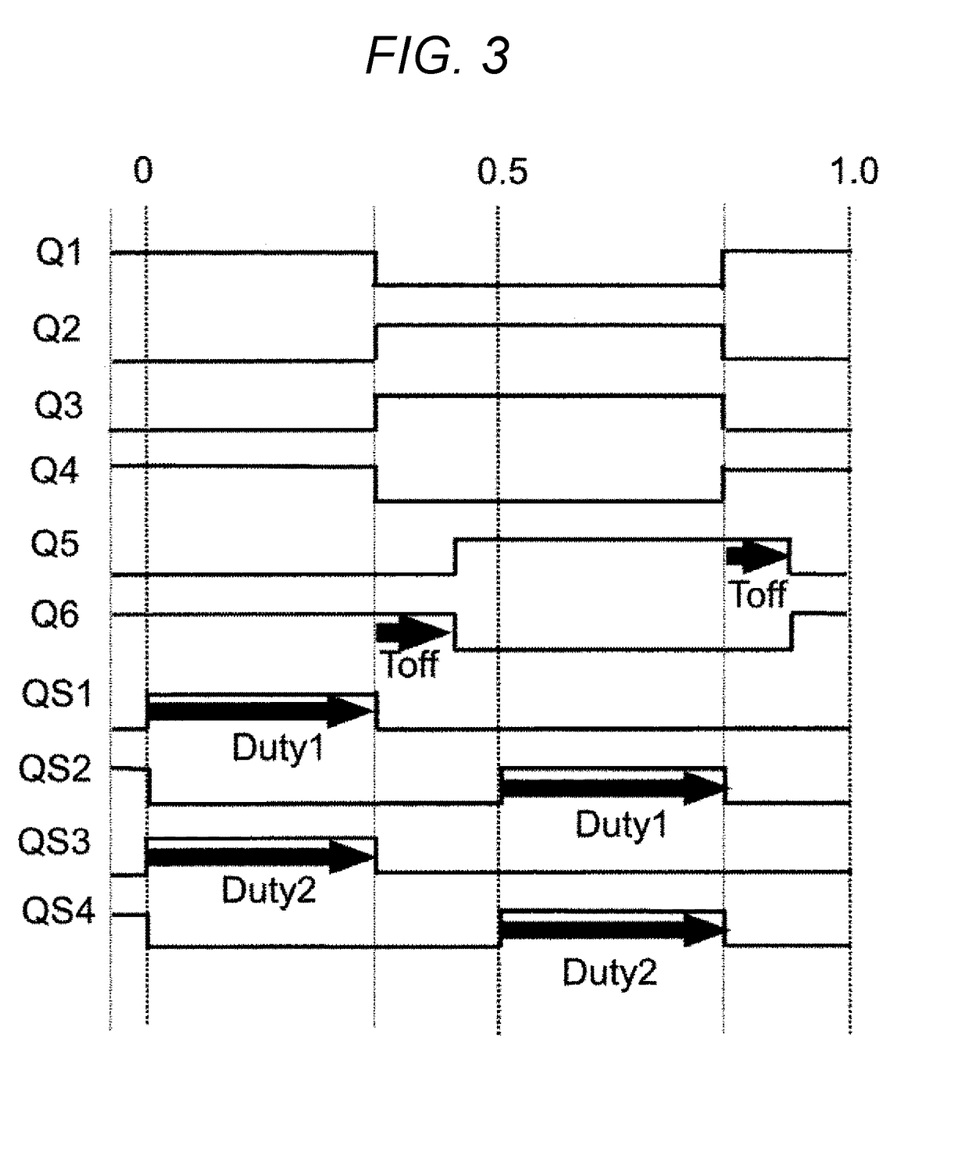
FIG. 3 illustrates a gate signal waveform of the power conversion device in the first embodiment.

FIG. 3 is a diagram illustrating a gate signal waveform of the switching power supply device in the case in which the current Io1 detected by the current detector 17 is larger than the current Io2 detected by the current detector 18 (Io1>Io2).

In a step-up operation, the control circuit 31 controls gate signals of the first low voltage circuit 5 and the second low voltage circuit to control the voltage applied to the first transformer 11 and the voltage applied to the second transformer 12. The common switching leg 2, the first switching leg 3, and the second switching leg 4 perform a rectification operation to feed the voltage applied to the first transformer 11 and the voltage applied to the second transformer 12 to the high voltage battery. At this time, time for turning off the MOSFET Q6 of the second switching leg 4 is delayed by Toff with respect to time for turning off gate signals of the MOSFET Q1 of the common switching leg 2 and the MOSFET Q4 of the first switching leg 3. A value of Toff is calculated by the control circuit 31 such that the current Io1 detected by the current detector 17 and the current Io2 detected by the current detector 18 become an average value of the two currents, using a difference of the current Io1 detected by the current detector 17 and the current Io2 detected by the current detector 18.

Figure 4:
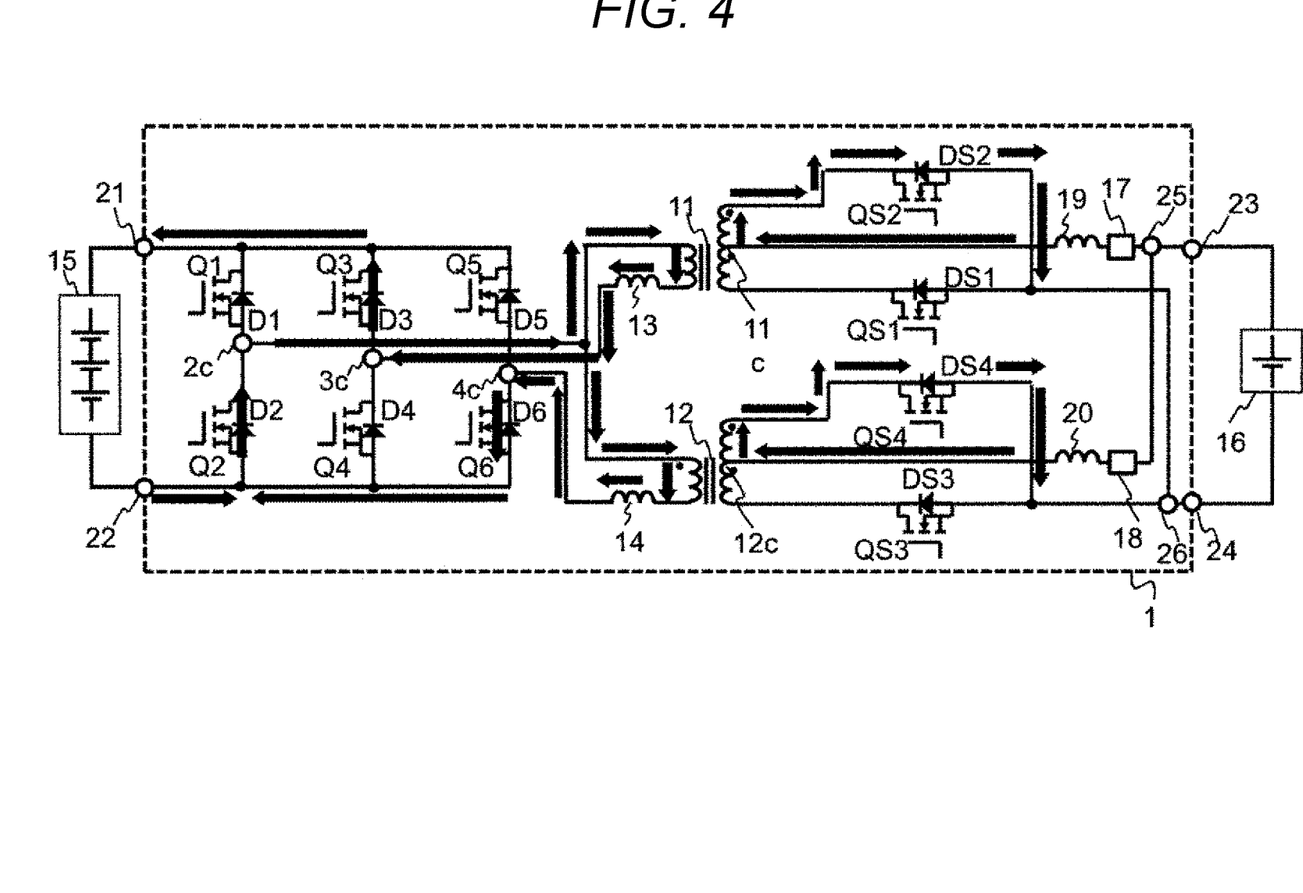
FIG. 4 is a diagram illustrating an operation state during a Toff period in the power conversion device according to the first embodiment.

FIG. 4 is a diagram illustrating an operation state of the switching power supply device 1 during a Toff period. For time until the MOSFET Q6 is turned off after the gate signals of the MOSFET Q1 and the MOSFET Q4 are turned off, the MOSFET QS1 is turned off and the MOSFET QS2 is turned off. In addition, the MOSFET Q1 is turned off, the MOSFET Q2 is turned on, the MOSFET Q3 is turned on, the MOSFET Q4 is turned off, the MOSFET Q5 is turned off, and the MOSFET Q6 is turned on.

By the first low voltage circuit 5, a current flows to the first transformer 11 in a direction toward the MOSFET QS2 from the middle point 11c of the first transformer 11. The current passes through the transformer 11 and a current amount according to the winding number ratio flows to a high voltage side. At the high voltage side, because the MOSFET Q1 in the common switching leg 2 is turned off, the MOSFET Q2 is turned on, the MOSFET Q3 in the first switching leg 3 is turned on, and the MOSFET Q4 is turned off, the current forms a current loop through which the current flows in order of the MOSFET Q2, the middle point 2c of the common switching leg 2, the first transformer 11, an inductor 13, the middle point 3c of the first switching leg 3, the MOSFET Q3, and the high voltage terminal 21, from the high voltage terminal 22. At this time, because it passes through the loop, the voltage applied to the first transformer 11 is applied to the high voltage battery 15. A difference of a voltage of the high voltage battery and a voltage of the low voltage battery according to the winding number ratio of the first transformer 11 is applied to the inductor 13. This value becomes a value close to zero. In this state, the MOSFET Q2 or Q3 may be turned off. In this case, the current passing through the common switching leg 2 and the first switching leg 3 passes through the body diode D2 of the MOSFET Q2 or the body diode D3 of the MOSFET Q3.

Meanwhile, by the second low voltage circuit 6, a current flows to the second transformer 12 in a direction toward the MOSFET QS4 from the middle point 12c of the second transformer 12. The current passes through the transformer 12 and a current amount according to the winding number ratio flows to the high voltage side. At the high voltage side, because the MOSFET Q1 in the common switching leg 2 is turned off, the MOSFET Q2 is turned on, the MOSFET Q5 is turned off, and the MOSFET Q6 is turned on, the current forms a current loop through which the current flows in order of the MOSFET Q2, the middle point 2c of the common switching leg 2, the second transformer 12, an inductor 14, the middle point 4c of the second switching leg 4, the MOSFET Q6, and the high voltage terminal 21, from the high voltage terminal 22. In this state, the MOSFET Q2 may be turned off. In this case, the current passing through the common switching leg 2 passes through the body diode D2 of the MOSFET Q2.

At this time, as in the loop, the voltage applied to the second transformer 12 is not applied to the high voltage battery 15, so that the voltage of the low voltage battery according to the winding number ratio of the first transformer 11 is applied to the inductor 14. That is, during the Toff period, both terminals of the second transformer 12 are electrically short-circuited. The current flowing through the second transformer 12 circulates without flowing to the high voltage battery 15. For this reason, during the Toff period, an amount of current flowing increases rapidly, due to a characteristic of the inductor 14 described in a formula (1). The formula (1) is a relational formula of the current flowing to the inductor and the voltage. VL is the voltage applied to the inductor, Lr is inductance, and di/dt is a slope of an amount of current flowing to the inductor.

[Formula 1]

$$V_L = L_r \times \frac{di}{dt} \tag{1}$$

According to the formula (1), while the voltage is applied to the inductor 14, the amount of current flowing increases due to the characteristic of the inductor 14. That is, current increase time is controlled, so that the amount of current flowing can be controlled. Therefore, the Toff time is controlled, so that a current amount of each parallel circuit in the switching power supply device can be controlled.

In the power conversion device according to this embodiment, the common switching leg 2 and the first switching leg 3 configure a first high voltage circuit and the common switching leg 2 and the second switching leg 4 configure a second high voltage circuit. As such, the power conversion device according to this embodiment includes the first low voltage circuit 5 and the first high voltage circuit connected via the first transformer 11 and the second low voltage circuit 6 and the second high voltage circuit connected via the second transformer 12. In addition, switching timings of the first high voltage circuit and the second high voltage circuit are controlled such that a current difference of an input current to the first low voltage circuit 5 and an input current to the second low voltage circuit 6 at the time of the step-up operation becomes smaller than a predetermined value. In other words, values of the currents flowing through the low voltage side circuits connected in parallel are balanced by switching operations of the high voltage side circuits.

In addition, in the power conversion device according to this embodiment, OFF timing of a switching control signal of the second switching leg 4 configuring the second high voltage circuit is delayed by Toff with respect to OFF timings of switching control signals of the common switching leg 2 and the first switching leg 3 configuring the first high voltage circuit. In addition, Toff to be a timing difference of OFF times is controlled such that a difference of currents flowing through the low voltage side terminals of each switching power supply becomes smaller.

When a current imbalance of the low voltage side circuits is controlled by Duty control of switching of the low voltage side circuits, a Duty ratio is limited and a range in which current control can be performed is limited. Meanwhile, according to the power conversion device according to this embodiment described above, the range in which the current control can be performed can be widened. In addition, the imbalance of the current flowing to the power conversion device can be suppressed and a design with a margin is unnecessary. Therefore, a cost and a size of the power conversion device can be reduced.

In addition, a loss variation due to the current imbalance is suppressed, so that efficiency of the entire power conversion device is improved. In addition, the flowing current is balanced, so that heat generation amounts of the elements are also balanced. Therefore, reliability of the elements is improved.

Second Embodiment

Figure 5:
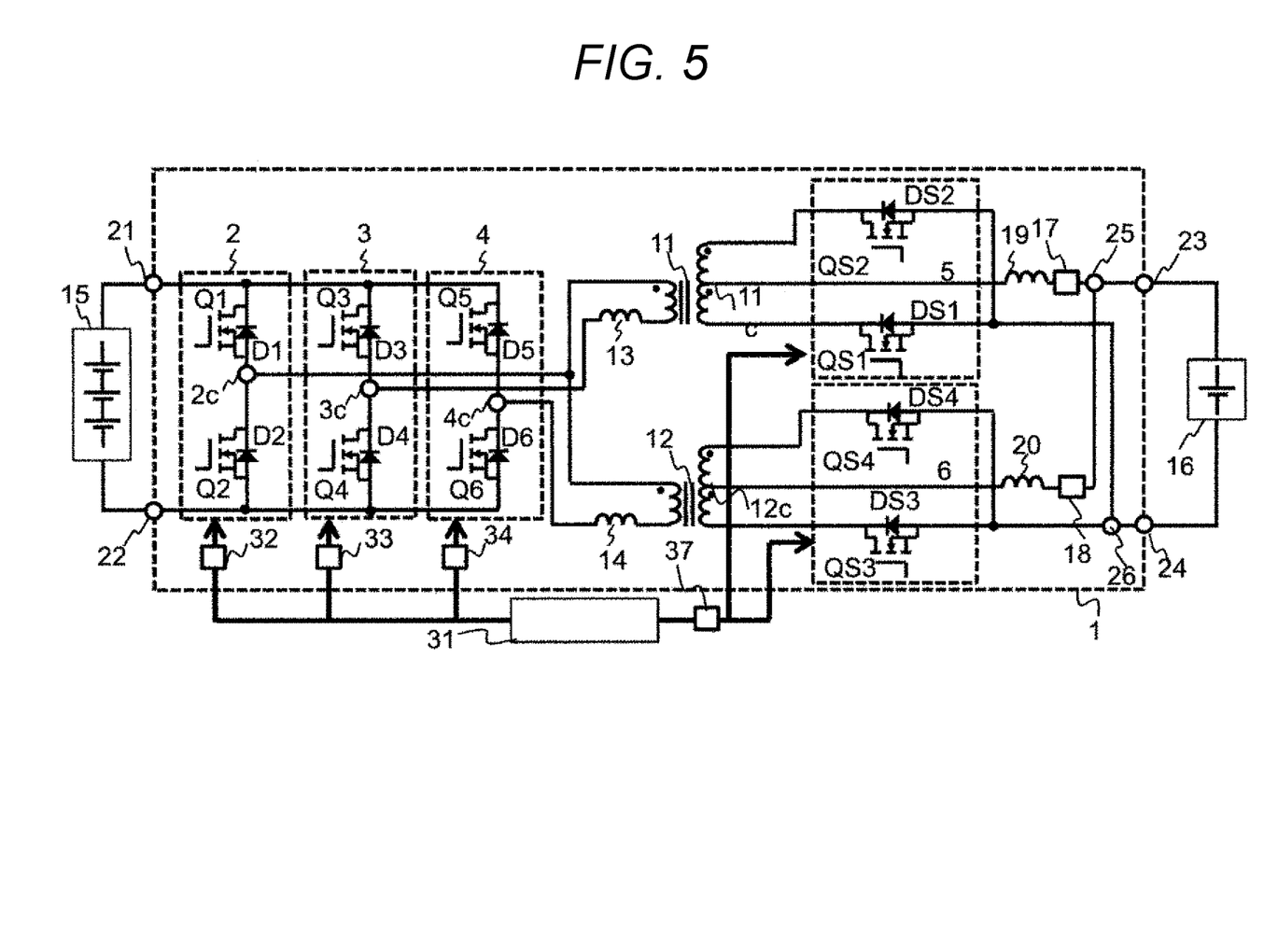
FIG. 5 is a diagram illustrating a circuit configuration of a power conversion device in a second embodiment.

FIG. 5 is a configuration diagram of a power conversion device according to a second embodiment. The power conversion device according to this embodiment is the same as the power conversion device according to the first embodiment, except for a changed element. As the changed element, a common drive circuit 37 of low voltage circuits is used.

In the first embodiment, a current amount of each parallel circuit in a switching power supply device 1 can be controlled using a high voltage side switching element. For this reason, it is not necessary to control suppression of a current imbalance by a Duty ratio of a low voltage side switching element in each parallel circuit. Therefore, even if the Duty ratio of the low voltage side switching element in each parallel circuit is equalized, the current imbalance can be controlled. That is, in this embodiment, switching of low voltage side circuits can be driven on the basis of the same control signal.

Figure 6:
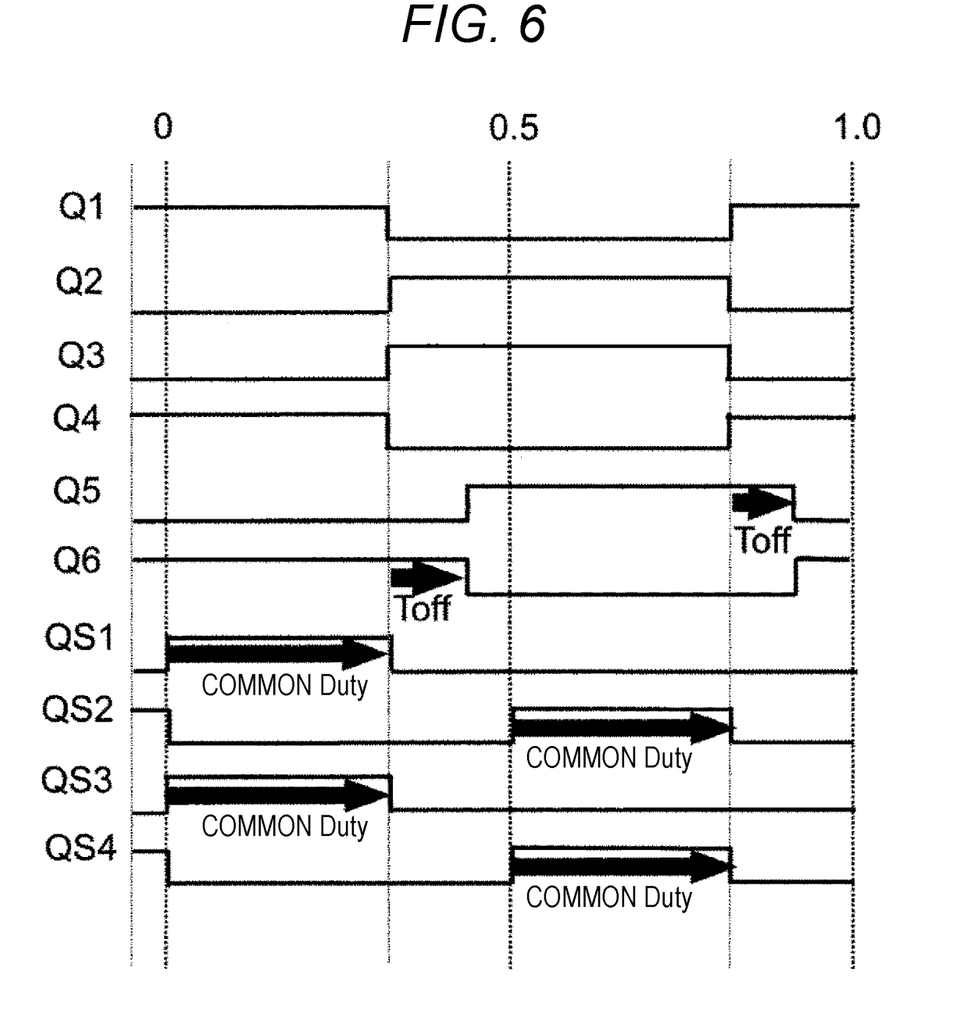
FIG. 6 illustrates a gate signal waveform of the power conversion device in the second embodiment.

FIG. 6 is a diagram illustrating a gate signal waveform of the switching power supply device in the case in which the common drive circuit 37 of the low voltage circuits is used. Because a gate waveform of the high voltage side switching element is the same as the gate waveform in the first embodiment, the gate waveform is omitted. At the low voltage side, because the common drive circuit 37 of the low voltage circuits is used, gate waveforms of MOSFETs in a low voltage circuit 5 and a low voltage circuit 6 are the same and common Duty is output. Therefore, the same voltage is applied to a first transformer 11 and a second transformer 12.

Meanwhile, when the current imbalance occurs due to an element variation, similarly to the first embodiment, Toff time is controlled using the high voltage side switching element, so that the current imbalance of each parallel circuit in the switching power supply device 1 is suppressed.

According to the power conversion device according to this embodiment, because drive signals of the switching elements are output on the basis of the control signal common to the first low voltage circuit 5 and the second low voltage circuit 6, it is not necessary to control low voltage side elements independently and it is possible to reduce drive circuits to drive the low voltage side elements according to a parallel number. As a result, reduction of a cost and a size of the power conversion device can be realized by reducing the number of components.

Third Embodiment

Figure 7:
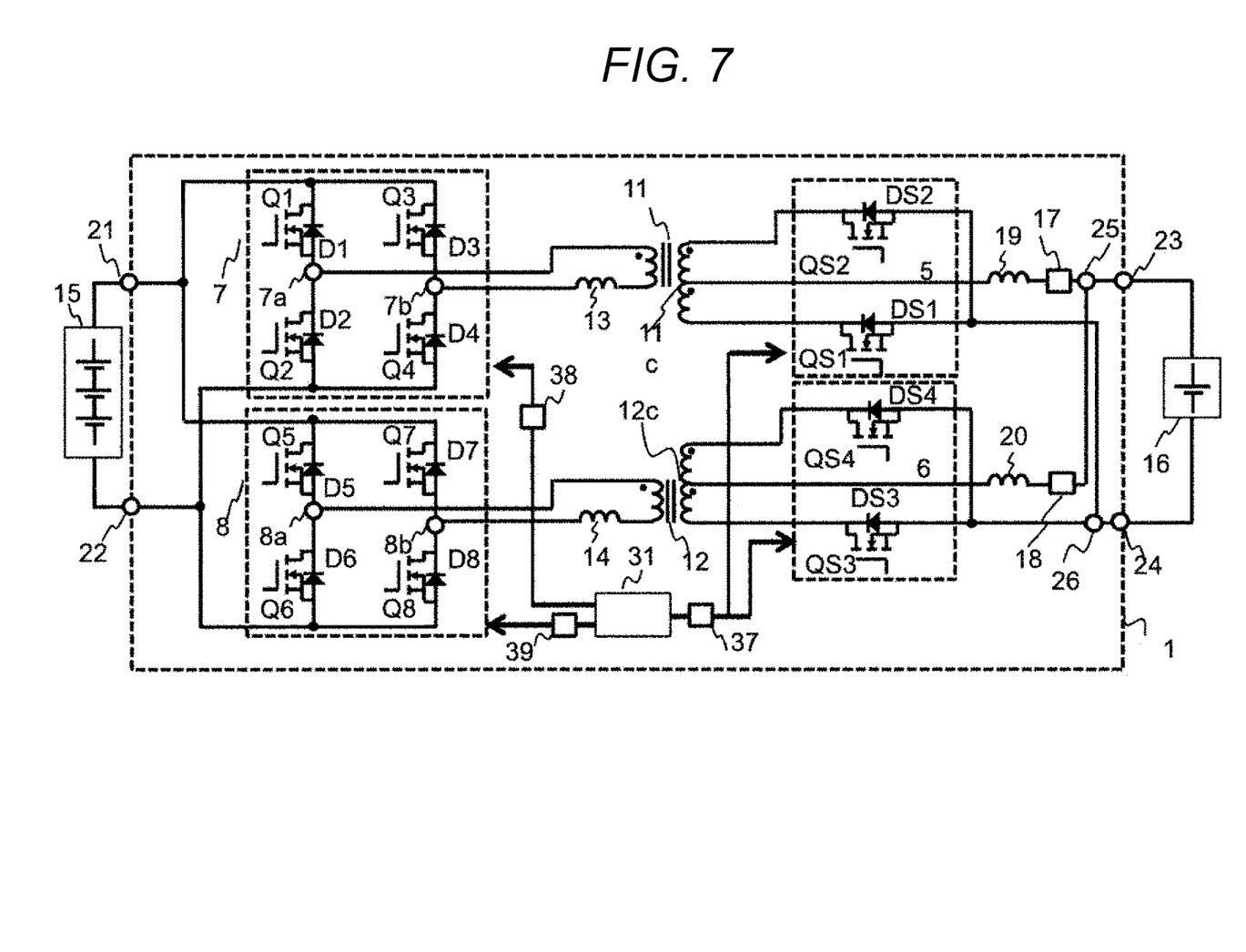
FIG. 7 is a diagram illustrating a circuit configuration of a power conversion device in a third embodiment.

FIG. 7 is a configuration diagram of a power conversion device according to a third embodiment. The power conversion device according to this embodiment is the same as the power conversion devices according to the first and second embodiments, except for changed elements. In this embodiment, at a high voltage side, a common switching leg 2, a first switching leg 3, and a second switching leg 4 are removed and a first high voltage circuit 7 and a second high voltage circuit 8 having switching elements of a full bridge configuration are added.

One terminal of the first high voltage circuit 7 to be a full bridge circuit configured using switching elements is connected to a high voltage terminal 21 of a switching power supply device 1. In addition, the other terminal of the first high voltage circuit 7 to be the full bridge circuit configured using the switching elements is connected to a high voltage terminal 22. Furthermore, a middle point 7a of a switching leg of the first high voltage circuit 7 is connected to one terminal of a first transformer 11 and a middle point 7b of a switching leg of the first high voltage circuit 7 is connected to the other terminal of the first transformer 11. Likewise, one terminal of the second high voltage circuit 8 to be a full bridge circuit configured using switching elements is connected to the high voltage terminal 21 of the switching power supply device 1. In addition, the other terminal of the second high voltage circuit 8 to be the full bridge circuit configured using the switching elements is connected to the high voltage terminal 22. Furthermore, a middle point 8a of a switching leg of the second high voltage circuit 8 is connected to one terminal of a second transformer 12 and a middle point 8b of a switching leg of the second high voltage circuit 8 is connected to the other terminal of the second transformer 12.

The first transformer 11 is connected to a first low voltage circuit 5 including switching elements QS1 and QS2 and diodes DS1 and DS2 and the first low voltage circuit 5 is connected to a parallel circuit connection terminal 26. A middle point 11c of the first transformer 11 is connected to one terminal of a smoothing inductor 19. The other terminal of the smoothing inductor 19 is connected to one terminal of a current detector 17 which detects a current. The other terminal of the current detector 17 is connected to a parallel connection terminal 25. The second transformer 12 is connected to a second low voltage circuit 6 including switching elements QS3 and QS4 and diodes DS3 and DS4 and the second low voltage circuit 6 is connected to the parallel circuit connection terminal 26. A middle point 12c of the second transformer 12 is connected to one terminal of a smoothing inductor 20. The other terminal of the smoothing inductor 20 is connected to one terminal of a current detector 18 which detects a current. The other terminal of the current detector 18 is connected to the parallel connection terminal 25.

A low voltage terminal 23 of the switching power supply device 1 is connected to a positive electrode of a low voltage battery 16. A low voltage terminal 24 of the switching power supply device 1 is connected to a negative electrode of the low voltage battery 16. Furthermore, a smoothing capacitor may be inserted in parallel with the low voltage battery and a low voltage load may be connected in parallel in addition to the low voltage battery. In addition, a smoothing circuit configured using an inductor and a capacitor may be inserted into the low voltage circuits 5 and 6.

The power conversion device according to this embodiment includes a control circuit 31. The control circuit 31 controls operations of the first high voltage circuit 7, the second high voltage circuit 8, the first low voltage circuit 5, and the second low voltage circuit. Each control signal output from the control circuit 31 is input to a drive circuit 32 of a common switching leg, drive circuits 38 and 39 of the high voltage circuits, and a common low voltage drive circuit 37 and is converted into power capable of driving each switching element.

In this embodiment described in FIG. 7, the first transformer 11 and the second transformer 12 adopt a center tap method. However, a current doubler method or other method may be used. In addition, in the switching power supply device 1, the current detector 17 detecting the current is connected between the parallel connection terminal 25 and the middle point 11c of the first transformer 11. However, the current detector 17 may be provided in a place where a current amount of a parallel circuit can be detected. The current detector 18 detecting the current is connected between the parallel connection terminal 26 and the middle point 12c of the first transformer 12. However, the current detector 18 may be provided in a place where a current amount of a parallel circuit can be detected. In addition, if winding number ratios of the first transformer 11 and the second transformer 12 are equal to each other, winding numbers of the first transformer 11 and the second transformer 12 may be different from each other.

The control circuit 31 monitors the currents detected by the current detectors 17 and 18. The control circuit 31 controls the operations of the first high voltage circuit 7, the second high voltage circuit 8, the first low voltage circuit 5, and the second low voltage circuit 6, on the basis of the detected current amounts. Here, the current detected by the current detector 17 of the switching power supply device 1 is defined as Io1 and the current detected by the current detector 18 of the switching power supply device 1 is defined as Io2.

Hereinafter, it is assumed that the current Io1 detected by the current detector 17 is larger than the current Io2 detected by the current detector 18 (Io1>Io2) due to an element variation, in the switching power supply device 1. When the current Io1 detected by the current detector 17 is smaller than the current Io2 detected by the current detector 18 (Io2>Io1), a symmetrical operation is performed.

Figure 8:
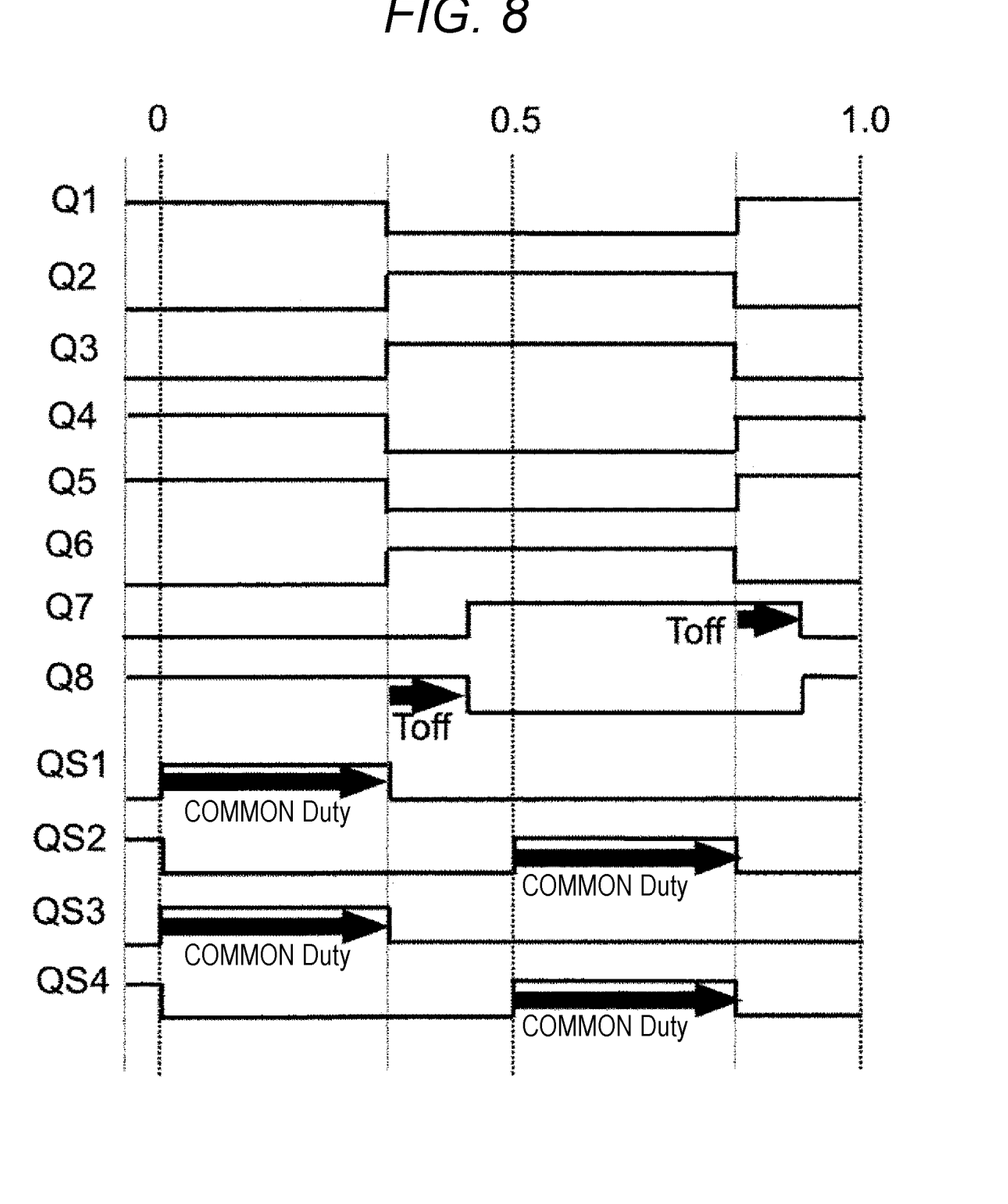
FIG. 8 illustrates a gate signal waveform of the power conversion device in the third embodiment.

FIG. 8 is a diagram illustrating a gate signal waveform of the switching power supply device in the case in which the current Io1 detected by the current detector 17 is larger than the current Io2 detected by the current detector 18 (Io1>Io2).

In a step-up operation, the control circuit 31 controls gate signals of the first low voltage circuit 5 and the second low voltage circuit to control a voltage applied to the first transformer 11 and a voltage applied to the second transformer 12. The first high voltage circuit 7 and the second high voltage circuit 8 perform a rectification operation to feed the voltage applied to the first transformer 11 and the voltage applied to the second transformer 12 to a high voltage battery. At this time, time for turning off a gate signal of a MOSFET Q8 of the second high voltage circuit 8 is delayed by Toff with respect to time for turning off gate signals of MOSFETs Q1 and Q4 of the first high voltage circuit 7. A value of Toff is calculated by the control circuit 31 such that the current Io1 detected by the current detector 17 and the current Io2 detected by the current detector 18 become an average value of the two currents, using a difference of the current Io1 detected by the current detector 17 and the current Io2 detected by the current detector 18.

FIG. 8 is a diagram illustrating an operation state of the switching power supply device 1 during a Toff period. During the Toff period, the MOSFET QS1 in the first low voltage circuit 5 is turned off and the MOSFET QS2 is turned off. In addition, the MOSFETs Q1 and Q4 in the first high voltage circuit 7 are turned off and the MOSFETs Q2 and Q3 are turned on. The MOSFETs Q5 and Q7 in the second high voltage circuit 8 are turned off and the MOSFETs Q6 and Q8 are turned on.

By the first low voltage circuit 5, a current flows to the first transformer 11 in a direction toward the MOSFET QS2 from the middle point 11c of the first transformer 11. The current passes through the transformer 11 and a current amount according to the winding number ratio flows to a high voltage side. At the high voltage side, because the MOSFETs Q1 and Q4 in the first high voltage circuit 7 are turned off and the MOSFETs Q2 and Q3 are turned on, the current forms a current loop through which the current flows in order of the MOSFET Q2, one middle point 7a of the first high voltage circuit 7, the first transformer 11, an inductor 13, the other middle point 7b of the first high voltage circuit 7, the MOSFET Q3, and the high voltage terminal 21, from the high voltage terminal 22. At this time, as in the loop, the voltage applied to the first transformer 11 is applied to a high voltage battery 15, so that a difference of a voltage of the high voltage battery and a voltage of the low voltage battery according to the winding number ratio of the first transformer 11 is applied to the inductor 13. This value becomes a value close to zero. In this state, the MOSFET Q2 and Q3 may be turned off. In this case, the current passing through the first high voltage circuit passes through a body diode D2 of the MOSFET Q2 and a body diode D3 of the MOSFET Q3.

Meanwhile, by the second low voltage circuit 6, a current flows to the second transformer 12 in a direction toward the MOSFET QS4 from the middle point 12c of the second transformer 12. The current passes through the transformer 12 and a current amount according to the winding number ratio flows to the high voltage side. At the high voltage side, because the MOSFETs Q5 and Q7 in the second high voltage circuit 8 are turned off and the MOSFETs Q6 and Q8 are turned on, the current forms a current loop through which the current flows in order of the MOSFET Q6, one middle point 8a of the second high voltage circuit 8, the second transformer 12, an inductor 14, the other middle point 8b of the second high voltage circuit 8, the MOSFET Q8, and the high voltage terminal 22, from the high voltage terminal 22. In this state, the MOSFET Q6 may be turned off. In this case, the current passing through the second high voltage circuit passes through a body diode D6 of the MOSFET Q6. At this time, as in the loop, the voltage applied to the second transformer 12 is not applied to the high voltage battery 15, so that the voltage from the low voltage side is applied to the inductor 14. For this reason, during the Toff period, an amount of current flowing increases rapidly, due to the characteristic of the inductor 14 described in the formula (1) in the first embodiment. According to the formula (1), while the voltage is applied to the inductor 14, the amount of current flowing increases due to the characteristic of the inductor 14. That is, current increase time is controlled, so that the amount of current flowing can be controlled. Therefore, the Toff time is controlled, so that a current amount of each parallel circuit in the switching power supply device can be controlled.

According to the power conversion device according to this embodiment, the time for turning off the gate signals of the MOSFETs Q5 and Q8 of the second high voltage circuit 7 is delayed by Toff with respect to the time for turning off the gate signals of the MOSFETs Q1 and Q4 of the first high voltage circuit 7 and a timing difference Toff of the OFF times is controlled such that a difference of amounts of currents flowing through the low voltage side terminals of each switching power supply becomes smaller. As a result, a current imbalance between the individual parallel circuits in the current flowing to the switching power supply device 1 can be suppressed and a design with a margin is unnecessary. Therefore, a cost and a size of the power conversion device can be reduced.

Fourth Embodiment

Figure 9:
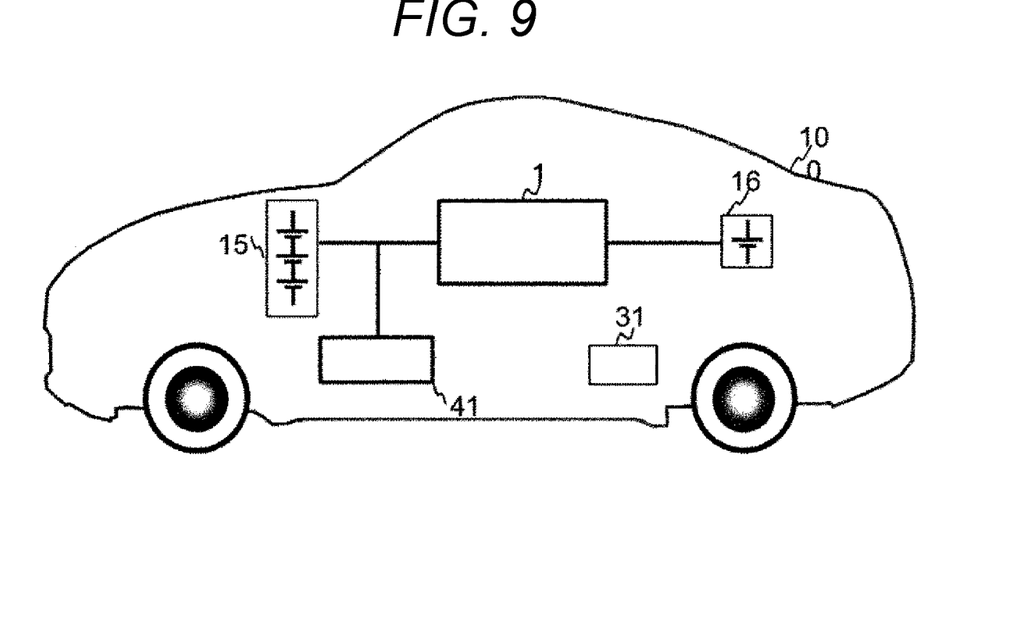
FIG. 9 is a configuration diagram of components mounted on a vehicle in a fourth embodiment.

A fourth embodiment relates to a method of using the switching power supply device 1 in the first to third embodiments. FIG. 9 illustrates an embodiment of the case in which an example of a power supply system including the switching power supply device 1 in the first to third embodiments is applied to a vehicle 100.

In a step-up operation, there are the following three operation modes (a) to (c).

(a) Mode of charging from low voltage battery during discharging of high voltage battery 15

Figure 10A:
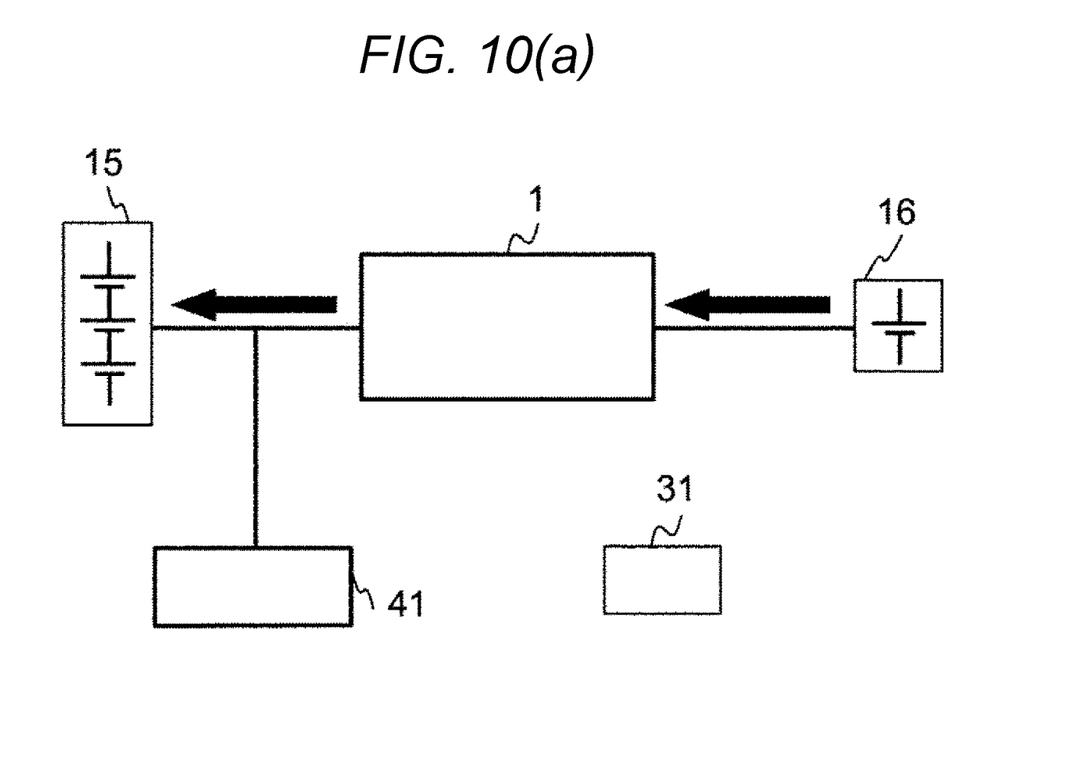

FIG. 10 (a) is a diagram illustrating a state in which step-up is performed from a low voltage battery 16 using the switching power supply device 1 and power is supplied to the high voltage battery 15. When the high voltage battery 15 performs discharging and a high voltage side load cannot operate, the power is stepped up from the low voltage battery 16 using the switching power supply device 1 and the power is supplied to the high voltage battery 15. At this time, a power capacity of the switching power supply device 1 operates from a light load state with a small current amount to a heavy load state with a large current amount. A control circuit 31 determines the operation mode by the required power capacity.

In the first and third embodiments, when the required power is small, the operation mode becomes the light load mode in which either a low voltage circuit 5 or a low voltage circuit 6 is stopped. In the light load mode, because either the low voltage circuit 5 or the low voltage circuit 6 is stopped, a voltage is not applied to either a first transformer 11 or a second transformer 12. Alternatively, a switch for current switching may be provided such that a current can flow to either the low voltage circuit 5 or the low voltage circuit 6, as an operation of the light load mode.

Meanwhile, when the required power is large, the operation mode becomes the heavy load mode in which both the low voltage circuit 5 and the low voltage circuit 6 are operated and a voltage is applied to both the first transformer 11 and the second transformer 12. In the heavy load mode, because each parallel circuit of the switching power supply device 1 operates, Toff time described in the first and third embodiments is controlled and a current difference of each parallel circuit is controlled to be smaller.

(b) Mode of power supplying from low voltage battery 16 to high voltage side load 41 during failing of high voltage battery 15

Figure 10B:
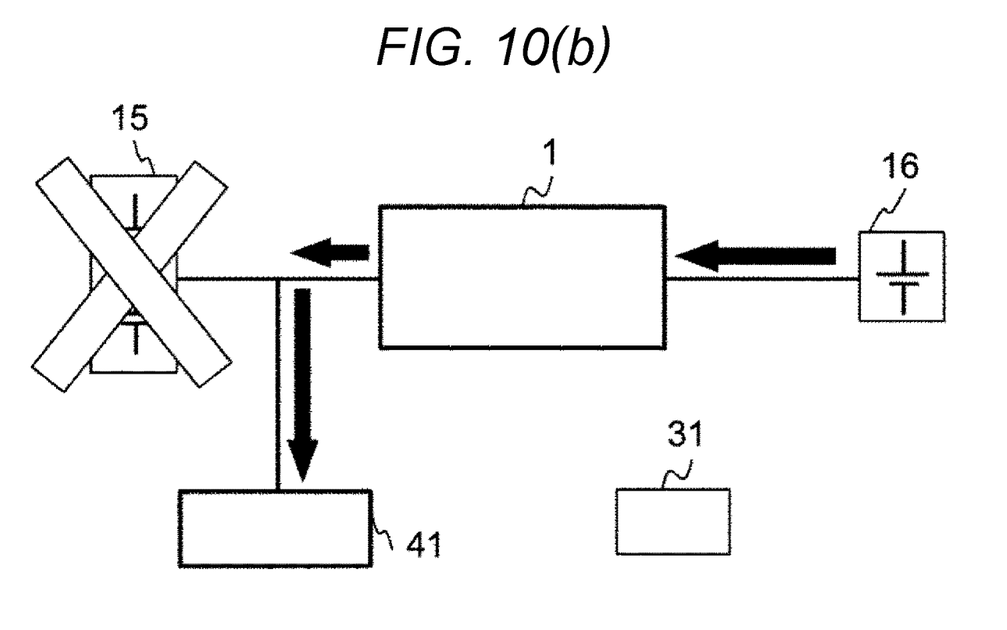

FIG. 10 (b) is a diagram illustrating a state in which step-up is performed from the low voltage battery 16 using the switching power supply device 1 and power is supplied to the high voltage side load 41. When the power cannot be supplied to the high voltage side load during failing of the high voltage battery 15, the power is stepped up from the low voltage battery 16 using the switching power supply device 1 and the power is supplied to the high voltage side load 41. At this time, the power capacity of the switching power supply device 1 operates from the light load state with the small current amount to the heavy load state with the large current amount.

In the switching power supply device 1, the control circuit 31 determines the operation mode by the required power capacity. In the first and third embodiments, when the required power is small, the operation mode becomes the light load mode. Meanwhile, when the required power is large, the operation mode becomes the heavy load mode. In the heavy load mode, because each parallel circuit of the switching power supply device 1 operates, an operation for delaying the Toff time described in the first and third embodiments is performed and the current difference of each parallel circuit is controlled to be smaller.

(c) Discharging from low voltage battery 16 to diagnose deterioration of low voltage battery 16

Figure 10C:
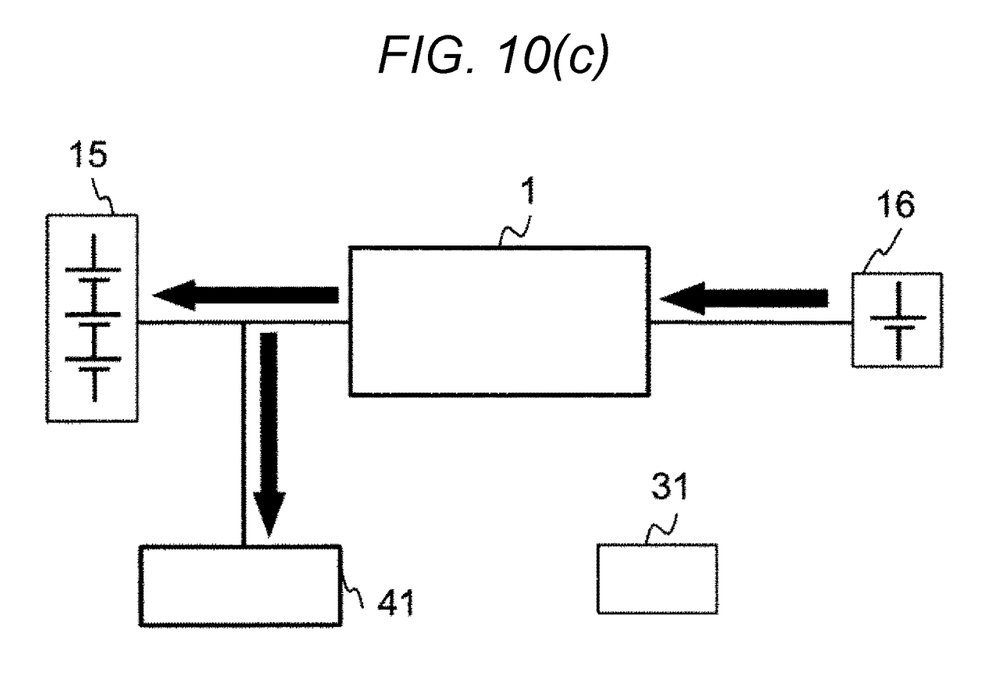

FIG. 10 (c) is a diagram illustrating a state in which step-up is performed from the low voltage battery 16 using the switching power supply device 1 and power is discharged to the high voltage battery 15 and the high voltage side load 41. When rated power is discharged for a short time to diagnose the deterioration of the low voltage battery 16, the power is stepped up from the low voltage battery 16 using the switching power supply device 1 and the power is discharged to the high voltage battery or the high voltage side load 41. At this time, the power capacity of the switching power supply device 1 operates from the light load state with the small current amount to the heavy load state with the large current amount.

In the switching power supply device 1, the control circuit 31 determines the operation mode by the required power capacity. In the first and third embodiments, when the required power is small, the operation mode becomes the light load mode. Meanwhile, when the required power is large, the operation mode becomes the heavy load mode. In the heavy load mode, because each parallel circuit of the switching power supply device 1 operates, an operation for delaying the Toff time described in the first and third embodiments is performed and the current difference of each parallel circuit is controlled to be smaller.

According to the power supply system according to this embodiment, the operation is enabled from the light load state with the small current amount to the heavy load state with the large current amount, at the time of step-up in each state of (a) charging from low voltage battery during discharging of high voltage battery 15, (b) power supplying from low voltage battery 16 to high voltage side load 41 during failing of high voltage battery 15, and (c) discharging from low voltage battery 16 to diagnose deterioration of low voltage battery 16. In the light load state, because the voltage is not applied to either the first transformer 11 or the second transformer 12, iron loss of each transformer is reduced and a high efficient operation of the switching power supply device 1 is enabled. In addition, in the heavy load state, Toff is controlled according to the imbalance of the current flowing to each switching power supply device, so that the current imbalance can be suppressed. As a result, because a design with a margin is unnecessary, a cost and a size of the power conversion device can be reduced.

In the light load mode, either the low voltage circuit 5 or the low voltage circuit 6 is stopped as described above. However, it is not always necessary to operate only one of the low voltage circuits. That is, the light load mode includes a mode in which the low voltage circuit 5 and the low voltage circuit 6 are alternately driven. For example, when the low voltage circuit 5 and the low voltage circuit 6 are alternately driven as described above, heat generation in each transformer can be alternated. Therefore, a thermal deviation can be suppressed.

In this embodiment, the example of the case in which the power supply system is applied to the vehicle has been described. However, applications to other power supply systems are also enabled.

REFERENCE SIGNS LIST

1 switching power supply device
2 common switching leg
3 first switching leg
4 second switching leg
5 first low voltage circuit
6 second low voltage circuit
11 first transformer
12 second transformer
13 first inductor
14 second inductor
15 high voltage battery
16 low voltage battery
17, 18 current detector
19, 20 smoothing inductor
21, 22 high voltage terminal
23, 24 low voltage terminal
25, 26 parallel circuit connection terminal
31 control circuit
32 drive circuit of common switching leg
33, 34, 38, 39 drive circuit of high voltage circuit
35, 36 drive circuit of low voltage circuit
37 common drive circuit of low voltage circuit
41 high voltage side load

The invention claimed is:

1. A power conversion device comprising:
   a first low voltage side circuit and a first high voltage side circuit which are connected via a first transformer;
   a second low voltage side circuit and a second high voltage side circuit which are connected via a second transformer; and
   a control circuit configured to:
   control switching timings of the first high voltage side circuit and the second high voltage side circuit such that a current difference of an input current to the first low voltage side circuit and an input current to the second low voltage side circuit during a step-up operation is reduced and becomes smaller than a predetermined value to balance the input currents, and
   control the first high voltage side circuit and the second high voltage side circuit during the step-up operation such that a period for electrically short-circuiting both terminals of any one transformer of the first transformer and the second transformer at the switching timing of the first high voltage side circuit or the second high voltage side circuit is provided.

2. The power conversion device according to claim 1, wherein
   a driver circuit to output a drive signal of a switching element is included in at least one of the first low voltage side circuit and the second low voltage side circuit.

3. The power conversion device according to claim 2, wherein
   the driver circuit to output the drive signal is included in each of the first low voltage side circuit and the second low voltage side circuit, and
   the driver circuit outputs the drive signal, on the basis of a control signal common to the first low voltage side circuit and the second low voltage side circuit.

4. The power conversion device according to claim 1, wherein
   at least one of the first high voltage side circuit or the second high voltage side circuit has a first switching leg in which one terminal of the first transformer is connected to a connection point of an upper arm side switching element and a lower arm side switching element and a second switching leg in which the other terminal of the first transformer is connected to a connection point of an upper arm side switching element and a lower arm side switching element, and
   the at least one of the first high voltage side circuit or the second high voltage side circuit is controlled such that a period for turning on the upper arm side switching element of the first switching leg and the upper arm side switching element of the second switching leg or turning on the lower arm side switching element of the first switching leg and the lower arm side switching element of the second switching leg is provided.

5. The power conversion device according to claim 1, wherein
   the period is calculated on the basis of the current difference of the input current to the first low voltage side circuit and the input current to the second low voltage side circuit.

6. The power conversion device according to claim 1, wherein
   the first high voltage side circuit is configured using a common switching leg connected to one terminal of the first transformer and connected to one terminal of the second transformer and a first switching leg connected to the other terminal of the first transformer, and the second high voltage side circuit is configured using the common switching leg and a second switching leg connected to the other terminal of the second transformer.

7. A power supply system comprising:
the power conversion device according to claim 1;
a high voltage side battery which is connected to the first high voltage side circuit and the second high voltage side circuit; and
a low voltage side battery which is connected to the first low voltage side circuit and the second low voltage side circuit,
wherein the high voltage side battery is charged with a voltage of the low voltage side battery via the power conversion device.

8. A power supply system comprising:
the power conversion device according to claim 1;
a high voltage side battery which is connected to the first high voltage side circuit and the second high voltage side circuit;
a low voltage side battery which is connected to the first low voltage side circuit and the second low voltage side circuit; and
a load which is connected in parallel with the high voltage side battery,
wherein a voltage of the low voltage side battery is supplied to the load via the power conversion device.

9. A power supply system according to claim 7, wherein
when a capacity of power supplied from the low voltage side battery is smaller than a predetermined value, an operation of any one of the first low voltage side circuit and the second low voltage side circuit is stopped, and
when the capacity of the power supplied from the low voltage side battery is larger than the predetermined value, both the first low voltage side circuit and the second low voltage side circuit are operated.

10. The power conversion device according to claim 1, wherein
at least one of the first high voltage side circuit or the second high voltage side circuit has a first switching leg in which one terminal of the first transformer is connected to a connection point of an upper arm side switching element and a lower arm side switching element and a second switching leg in which the other terminal of the first transformer is connected to a connection point of an upper arm side switching element and a lower arm side switching element, and
the at least one of the first high voltage side circuit or the second high voltage side circuit is controlled such that a period for turning on the upper arm side switching element of the first switching leg and the upper arm side switching element of the second switching leg or turning on the lower arm side switching element of the first switching leg and the lower arm side switching element of the second switching leg is provided.

11. The power conversion device according to claim 4, wherein
the period is calculated on the basis of the current difference of the input current to the first low voltage side circuit and the input current to the second low voltage side circuit.

12. The power conversion device according to claim 1, wherein
the period is calculated on the basis of the current difference of the input current to the first low voltage side circuit and the input current to the second low voltage side circuit.

13. A power supply system comprising:
the power conversion device according to claim 2;
a high voltage side battery which is connected to the first high voltage side circuit and the second high voltage side circuit; and
a low voltage side battery which is connected to the first low voltage side circuit and the second low voltage side circuit,
wherein the high voltage side battery is charged with a voltage of the low voltage side battery via the power conversion device.

14. A power supply system comprising:
the power conversion device according to claim 2;
a high voltage side battery which is connected to the first high voltage side circuit and the second high voltage side circuit;
a low voltage side battery which is connected to the first low voltage side circuit and the second low voltage side circuit; and
a load which is connected in parallel with the high voltage side battery,
wherein a voltage of the low voltage side battery is supplied to the load via the power conversion device.

15. A power supply system according to claim 8, wherein
when a capacity of power supplied from the low voltage side battery is smaller than a predetermined value, an operation of any one of the first low voltage side circuit and the second low voltage side circuit is stopped, and
when the capacity of the power supplied from the low voltage side battery is larger than the predetermined value, both the first low voltage side circuit and the second low voltage side circuit are operated.

* * * * *